United States Patent
Del Valle

(10) Patent No.: US 11,659,946 B2
(45) Date of Patent: May 30, 2023

(54) DRINKING CUP FILTER ASSEMBLY

(71) Applicant: Francisco Del Valle, Windermere, FL (US)

(72) Inventor: Francisco Del Valle, Windermere, FL (US)

( * ) Notice: Subject to any disclaimer, the term of this patent is extended or adjusted under 35 U.S.C. 154(b) by 979 days.

(21) Appl. No.: 16/520,494

(22) Filed: Jul. 24, 2019

(65) Prior Publication Data

US 2021/0022529 A1 Jan. 28, 2021

(51) Int. Cl.
*A47G 19/22* (2006.01)
*C02F 1/00* (2023.01)

(52) U.S. Cl.
CPC .......... *A47G 19/2216* (2013.01); *C02F 1/002* (2013.01); *A47G 2400/02* (2013.01)

(58) Field of Classification Search
CPC .. A47G 19/2216; A47G 2400/02; C02F 1/002
See application file for complete search history.

(56) References Cited

U.S. PATENT DOCUMENTS

| 1,174,518 | A | | 3/1916 | Nolda |
| 1,269,902 | A | | 6/1918 | Butler |
| 3,951,316 | A | | 4/1976 | O'Neal |
| 4,999,109 | A | | 3/1991 | Sabre |
| 5,190,643 | A | * | 3/1993 | Duncan .................. C02F 1/003 210/473 |
| 5,692,616 | A | | 12/1997 | Baker |
| 7,284,676 | B2 | | 12/2007 | Dantani |
| 8,167,162 | B2 | | 5/2012 | Levey |
| 8,960,476 | B2 | | 2/2015 | Nurse, Sr. |
| 2005/0051478 | A1 | | 3/2005 | Karanikos |

* cited by examiner

*Primary Examiner* — Waqaas Ali

(57) ABSTRACT

A drinking cup filter assembly for inhibiting a user's mouth from contacting a drinking cup includes a shield that has a first portion being spaced from a second portion to define a cup space between the first and second portions. The shield can be suspended on a lip of a drinking cup having the lip being positioned in the cup space. The first portion and the second portion inhibit a user's lips from contacting the drinking cup when the user drinks. The first portion has a plurality of fluid inlets and a fluid outlet to pass a beverage in the drinking cup through the fluid inlets and the fluid outlet. In this way the user can drink the beverage. A filter is removably positioned within the first portion of the shield to filter the beverage.

7 Claims, 3 Drawing Sheets

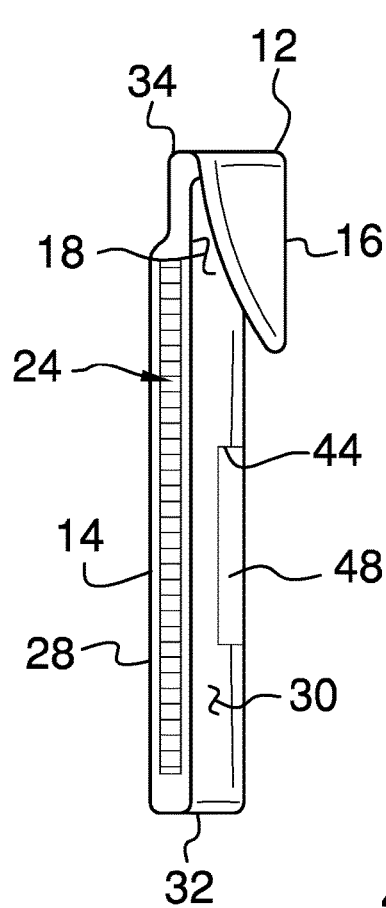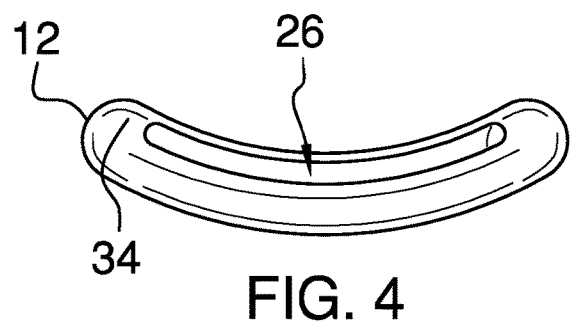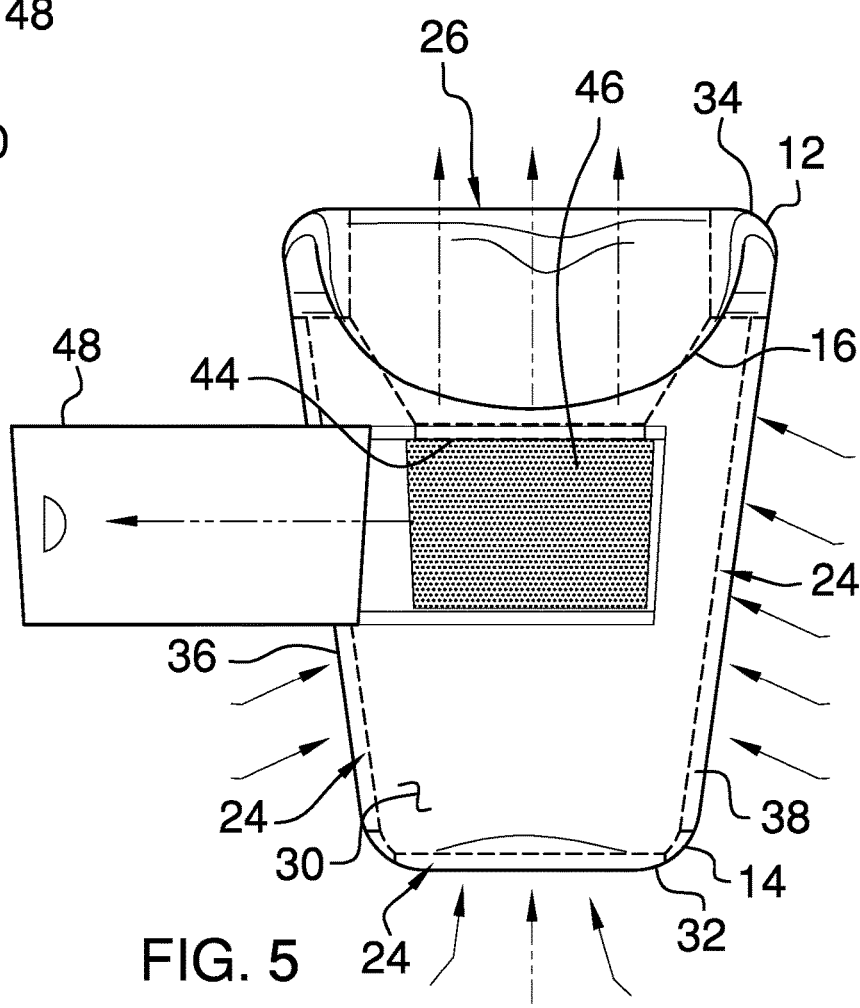
FIG. 3
FIG. 4
FIG. 5

DRINKING CUP FILTER ASSEMBLY

CROSS-REFERENCE TO RELATED APPLICATIONS

N/A

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to filter devices and more particularly pertains to a new filter device for inhibiting a user's mouth from contacting a drinking cup.

BRIEF SUMMARY OF THE INVENTION

An embodiment of the disclosure meets the needs presented above by generally comprising a shield that has a first portion being spaced from a second portion to define a cup space between the first and second portions. The shield can be suspended on a lip of a drinking cup having the lip being positioned in the cup space. The first portion and the second portion inhibit a user's lips from contacting the drinking cup when the user drinks. The first portion has a plurality of fluid inlets and a fluid outlet to pass a beverage in the drinking cup through the fluid inlets and the fluid outlet. In this way the user can drink the beverage. A filter is removably positioned within the first portion of the shield to filter the beverage.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a right side view of an embodiment of the disclosure.

FIG. 4 is a top view of an embodiment of the disclosure.

FIG. 5 is a back view of an embodiment of the disclosure.

DETAILED DESCRIPTION OF THE INVENTION

Figure 1:
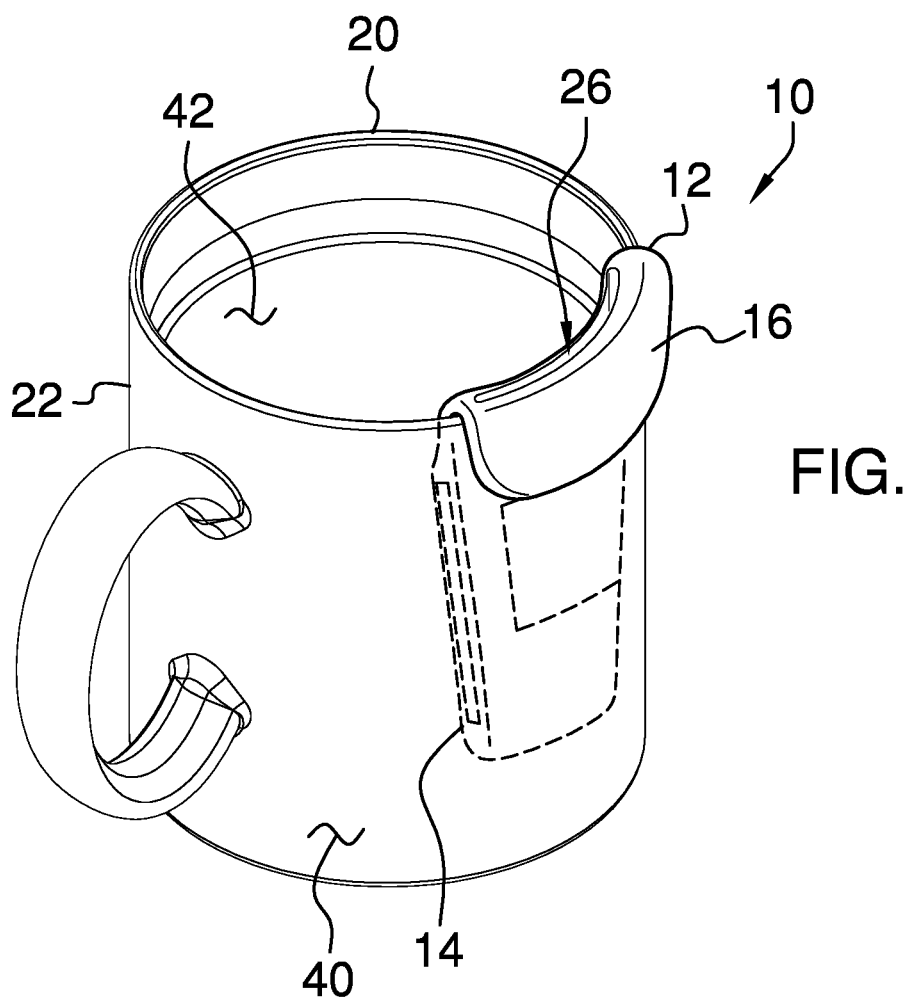
FIG. 1 is a phantom in-use view of a drinking cup filter assembly according to an embodiment of the disclosure.
Figure 2:
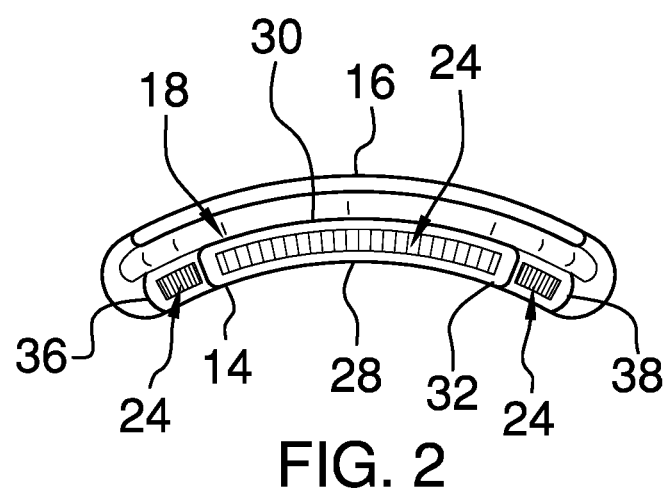
FIG. 2 is a bottom view of an embodiment of the disclosure.

With reference now to the drawings, and in particular to FIGS. 1 through 6 thereof, a new filter device embodying the principles and concepts of an embodiment of the disclosure and generally designated by the reference numeral 10 will be described.

As best illustrated in FIGS. 1 through 6, the drinking cup filter assembly 10 generally comprises a shield 12 that has a first portion 14 being spaced from a second portion 16 to define a cup space 18 between the first 14 and second 16 portions. The shield 12 can be suspended on a lip 20 of a drinking cup 22 having the lip 20 being positioned in the cup space 18. The first portion 14 is positioned inside the drinking cup 22 and the second portion 16 is positioned outside the drinking cup 22. Thus, a user's lips contact the first portion 14 and the second portion 16 when the user drinks from the drinking cup 22 thereby inhibiting the user's lips from contacting the drinking cup 22. In this way the user can rest assured that the user's mouth does not touch a potentially dirty cup in a restaurant or the like.

The first portion 14 has a plurality of fluid inlets 24 and a fluid outlet 26. In this way the first portion 14 can pass a beverage in the drinking cup 22 through the fluid inlets 24 and the fluid outlet 26 thereby facilitating the user to drink a beverage in the drinking cup 22. The first portion 14 has a front surface 28, a back surface 30, a bottom end 32, a top end 34, a first lateral side 36 and second lateral side 38. The first portion 14 extends downwardly into the drinking cup 22 when the shield 12 is positioned on the lip of the drinking cup 22. The second portion 16 extends downwardly along an outer surface 40 of the drinking cup 22 when the shield 12 is positioned on the lip.

The first portion 14 is hollow and each of the fluid inlets 24 extends through a respective one of the bottom end 32, the first lateral side 36 and the second lateral side 38. The fluid outlet 26 extends through the top end 34 to pass the beverage into the user's mouth. The back surface 30 is concavely arcuate with respect to the front surface 28 to conform to curvature of an interior surface 42 of the drinking cup 22. The back surface 30 has a filter opening 44 extending into an interior of the first portion 14. The shield 12 is comprised of a rigid, fluid impermeable material such as plastic or the like.

Figure 6:
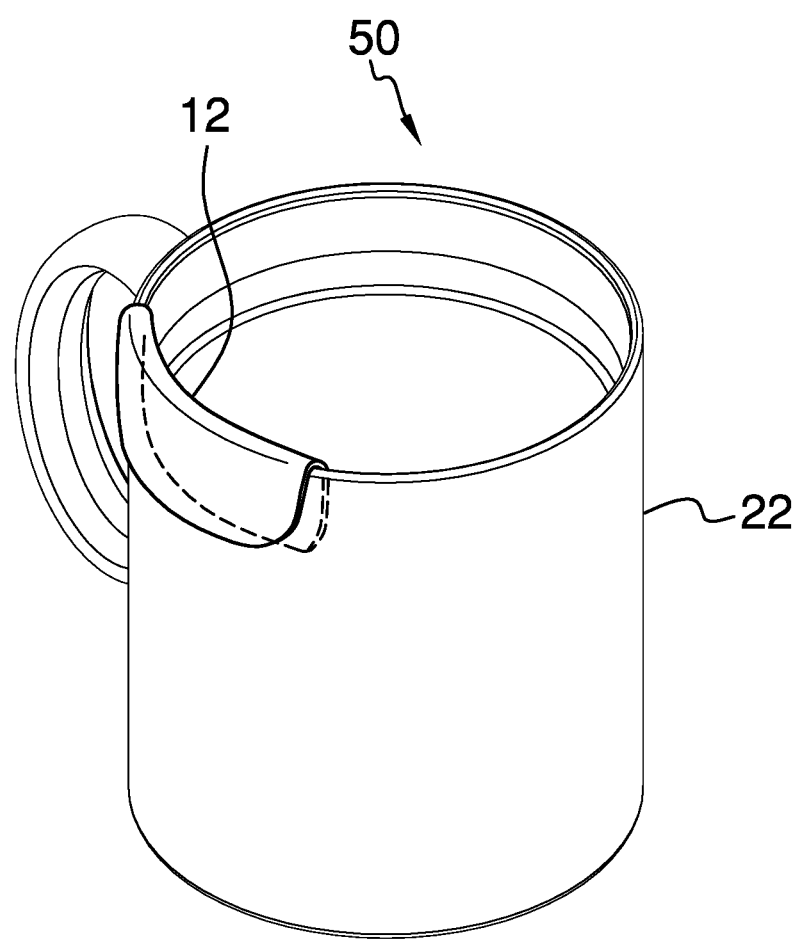
FIG. 6 is a perspective view of an alternative embodiment of the disclosure.

A filter 46 is provided and the filter 46 is removably positioned within the first portion 14 of the shield 12. In this way the filter 46 can filter the beverage as the beverage passes through the first portion 14. The filter 46 is insertable through the filter opening 44 on the back surface 30 of the first portion 14. The filter 46 may comprise a fluid filter of any conventional design. Additionally, the beverage can be consumed through the shield 12 without having the filter 46 in place. A door 48 is slidably coupled to the back surface 30 of the first portion 14. The door 48 covers the filter opening 44 when the door 48 is positioned in a closed position for retaining the filter 46 in the first portion 14. The first portion 14 has a length that is greater than a length of the second portion 16. In an alternative embodiment 50 as shown in FIG. 6, the first portion 14 may have a length that is equal to the length of the second portion 16.

In use, the shield 12 is positioned over the lip of the drinking cup 22 such that the first portion 14 extends into the drinking cup 22 and the second portion 16 is positioned outside the drinking cup 22. Thus, the user's lips contact the first portion 14 and the second portion 16 rather than the drinking cup 22 when the user drinks from the drinking cup. In this way the user's mouth is inhibited from contacting bacteria that may be on the drinking cup 22. The beverage in the drinking cup 22 flows into each of the fluid inlets 24 and outwardly through the fluid outlet 26 when the drinking cup 22 is tipped for drinking. In this way the filter 46 can filter the beverage when the beverage is drank.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A drinking cup filter assembly comprising:
   a drinking cup having a base wall and a perimeter wall, said perimeter wall being coupled to and extending upwardly from said base wall and terminating in a lip, said drinking cup having a reservoir positioned therein for containing a beverage, a top end of said drinking cup being open to said reservoir;
   a shield having a first portion and a second portion coupled to said first portion, said first portion defining a hollow tube, said second portion defining a hook extending laterally and downwardly from said first portion, wherein said second portion of said shield releasably engages said lip such that said first portion is positioned inside said reservoir adjacent to said perimeter wall of said drinking cup, said first portion having a plurality of fluid inlets and a fluid outlet, said fluid outlet being positioned adjacent to and facing upwardly from said lip; and
   a filter being removably positioned within said first portion of said shield wherein said filter is configured to filter the beverage.

2. The assembly according to claim 1, wherein said first portion has a front surface, a back surface, a bottom end, a top end, a first lateral side and a second lateral side, said second portion being coupled to said back surface of said first portion adjacent to said top end, said first portion extending downwardly into the beverage cup, said second portion extending downwardly along an outer surface of said perimeter wall each of said fluid inlets extending through a respective one of said bottom end, said first lateral side and said second lateral side, said fluid outlet extending through said top end.

3. The assembly according to claim 2, wherein said back surface is concavely arcuate with respect to said front surface wherein said back surface is configured to conform to curvature of an interior surface of said perimeter wall.

4. The assembly according to claim 2, wherein said back surface has a filter opening extending into an interior of said first portion.

5. The assembly according to claim 4, wherein said filter is insertable through said filter opening on said back surface of said first portion.

6. The assembly according to claim 5, further comprising a door being slidably coupled to said back surface of said first portion, said door covering said filter opening when said door is positioned in a closed position for retaining said filter in said first portion.

7. A drinking cup filter assembly comprising:
   a drinking cup having a base wall and a perimeter wall, said perimeter wall being coupled to and extending upwardly from said base wall and terminating in a lip, said drinking cup having a reservoir positioned therein for containing a beverage, a top end of said drinking cup being open to said reservoir;
   a shield having a first portion and a second portion coupled to said first portion, said first portion defining a hollow tube, said second portion defining a hook extending laterally and downwardly from said first portion, wherein said second portion of said shield releasably engages said lip such that said first portion is positioned inside said reservoir adjacent to said perimeter wall of said drinking cup, said first portion having a plurality of fluid inlets and a fluid outlet, said fluid outlet being positioned adjacent to and facing upwardly from said lip, said first portion having a front surface, a back surface, a bottom end, a top end, a first lateral side and second lateral side, said second portion being coupled to said back surface of said first portion adjacent to said top end, said first portion extending downwardly into the beverage cup, said second portion extending downwardly along an outer surface of said perimeter wall each of said fluid inlets extending through a respective one of said bottom end, said first lateral side and said second lateral side, said fluid outlet extending through said top end, said back surface being concavely arcuate with respect to said front surface wherein said back surface is configured to conform to curvature of an interior surface of said perimeter wall said back surface having a filter opening extending into an interior of said first portion;
   a filter being removably positioned within said first portion of said shield wherein said filter is configured to filter the beverage, said filter being insertable through said filter opening on said back surface of said first portion; and a door being slidably coupled to said back surface of said first portion, said door covering said filter opening when said door is positioned in a closed position for retaining said filter in said first portion.

\* \* \* \* \*